US011254495B2

(12) United States Patent
Qiu et al.

(10) Patent No.: US 11,254,495 B2
(45) Date of Patent: Feb. 22, 2022

(54) TRASH BAG DETECTION DEVICE, SMART TRASH RECEPTACLE AND METHOD FOR CONTROL OF AUTOMATIC BAG REPLACEMENT

(71) Applicant: SHANGHAI TOWNEW INTELLIGENT TECHNOLOGY CO., LTD., Shanghai (CN)

(72) Inventors: Beijing Qiu, Shanghai (CN); Jianxiang Li, Shanghai (CN)

(73) Assignee: SHANGHAI TOWNEW INTELLIGENT TECHNOLOGY CO., LTD., Shanghai (CN)

(*) Notice: Subject to any disclaimer, the term of this patent is extended or adjusted under 35 U.S.C. 154(b) by 34 days.

(21) Appl. No.: 16/201,510

(22) Filed: Nov. 27, 2018

(65) Prior Publication Data
US 2019/0382198 A1 Dec. 19, 2019

(30) Foreign Application Priority Data

Jun. 16, 2018 (CN) .......................... 201810623433.0
Jun. 16, 2018 (CN) .......................... 201810624081.0

(51) Int. Cl.
B65F 1/06 (2006.01)
B65F 1/16 (2006.01)
(Continued)

(52) U.S. Cl.
CPC ................ B65F 1/062 (2013.01); B65F 1/16 (2013.01); G05B 11/01 (2013.01); G08B 21/18 (2013.01);
(Continued)

(58) Field of Classification Search
CPC .......... B65F 2210/179; B65F 2210/168; B65F 2210/137
See application file for complete search history.

(56) References Cited

U.S. PATENT DOCUMENTS 7,012,685 B1 * 3/2006 Wilson ............... B01D 46/0086
356/239.1
2003/0144814 A1 * 7/2003 Hama ................. G06F 3/03545
702/159
(Continued)

FOREIGN PATENT DOCUMENTS

CN 104875989 A 9/2015

Primary Examiner — Robert A Cassity
(74) Attorney, Agent, or Firm — Rabin & Berdo, P.C.

(57) ABSTRACT

The present invention discloses a trash bag detection device for a smart trash receptacle, comprising a transmitter for transmitting a signal and a receiver for receiving a signal, both the transmitter and the receiver being disposed on internal surfaces of the trash receptacle, wherein the signal received by the receiver is a direct signal transmitted from the transmitter or a signal from the transmitter that has been reflected. The present invention also discloses a smart trash receptacle incorporating such a trash bag detection device and a method for control of automatic bag replacement. With the present invention, the position of a trash bag in the trash receptacle can be automatically detected, allowing improved intelligent control of the trash receptacle. This is helpful in protecting the trash bag, saving resources, reducing potential safety risks of the smart trash receptacle and increasing its stability and reliability.

5 Claims, 8 Drawing Sheets

(51) Int. Cl.
*G08B 21/18* (2006.01)
*G05B 11/01* (2006.01)

(52) U.S. Cl.
CPC ... *B65F 2210/137* (2013.01); *B65F 2210/168* (2013.01); *B65F 2210/179* (2013.01)

(56) References Cited

U.S. PATENT DOCUMENTS

| | | | | |
|---|---|---|---|---|
| 2013/0306639 | A1* | 11/2013 | Kastner | F04D 27/00 220/495.04 |
| 2014/0084008 | A1* | 3/2014 | Conway | B65F 1/14 220/495.04 |
| 2016/0053773 | A1* | 2/2016 | Fujimoto | F04D 17/16 415/206 |
| 2016/0061214 | A1* | 3/2016 | Hayamitsu | F04D 25/08 416/223 B |
| 2016/0354990 | A1* | 12/2016 | Skocypec | B30B 9/3032 |
| 2017/0096299 | A1* | 4/2017 | Yang | G10L 25/51 |
| 2017/0243279 | A1* | 8/2017 | Thompson | G01G 19/52 |

\* cited by examiner

TRASH BAG DETECTION DEVICE, SMART TRASH RECEPTACLE AND METHOD FOR CONTROL OF AUTOMATIC BAG REPLACEMENT

TECHNICAL FIELD

The present invention relates to the field of smart trash receptacles and, in particular, to a trash bag detection device, a smart trash receptacle and a method for control of automatic bag replacement.

BACKGROUND

With the advancement of science and technology and the improvement of people's living standards, smart homes are increasingly becoming an indispensable part of our lives. At present, smart trash receptacles have been a focus of people's attention thanks to their characteristics of cleanliness, sanitariness and convenience of use.

A conventional smart trash receptacle usually has a flip cover and an infrared (IR) sensing device arranged in the vicinity thereof. The IR sensing device can cause the flip cover to be opened when sensing an approaching user and closed after the user has left. Although this can save the step for manually opening/closing the flip cover, such a simple function lags far behind users' expectations. Therefore, research efforts in the art have been placed on developing the capabilities including intelligent sensing, automatic bagging and automatic bag replacement. Among these, automatic bag replacement can dispense with manual bag replacement that consumes much time and labor. In an automatic bag replacement process, a fan can be used to evacuate the air from a trash receptacle, making the ambient atmospheric pressure higher than the air pressure in the receptacle. As a result, the trash bag to be replaced is pushed into the receptacle under the action of the atmospheric pressure, thus enabling automatic bag replacement. However, most smart trash receptacles currently available in the marketplace only allow manual or semi-automatic bag replacement and do not have a device capable of effectively detecting the position of a trash bag within the receptacle. For this reason, it is impossible to determine whether the trash bag has been fully fitted in place so as to prevent partial breakage of the trash bag during its automatic replacement or even potentially other safety issues of the smart trash receptacle. This limits further development of intelligence in such smart trash receptacles.

Therefore, how to address the issue that conventional smart trash receptacles are incapable of detecting the position of a trash bag therein and hence tend to suffer from breakage of the trash bag during automatic bag replacement and how to satisfy the need for information about such intra-receptacle position of the trash bag for further intelligence in smart trash receptacles remain critical technical problems sought to be solved by those skilled in the art.

SUMMARY

In order to address the above problems to at least some extent, it is an object of the present invention to provide a trash bag detection device, a smart trash receptacle and a method for control of automatic bag replacement, which enable detecting the position of a trash bag in the receptacle and performing control based on the detection information about the trash bag so that a fitting process is kept running and ceases respectively before and after the trash bag is fitted in place.

In a first aspect of the present invention, there is provided a trash bag detection device for a smart trash receptacle, comprising a transmitter for transmitting a signal and a receiver for receiving a signal, both the transmitter and the receiver being disposed on internal surfaces of the trash receptacle, wherein the signal received by the receiver is a direct signal transmitted from the transmitter or a signal from the transmitter that has been reflected.

According to the present invention, the trash bag detection device may further comprise a fan for evacuating the trash receptacle and a control mechanism, wherein each of the transmitter, the receiver and the fan is communicatively coupled to the control mechanism, wherein the control mechanism is configured to control an operational status of the fan based on the signal received by the receiver, and wherein i) the signal received by the receiver is a direct signal sent from the transmitter, and in the event of a trash bag being present between the receiver and the transmitter, the receiver produces a first sense signal based on which the control mechanism instructs the fan to stop its operation; or ii) the signal received by the receiver is a signal from the transmitter that has been reflected, and in the event of a trash bag being present in the receptacle and close to both the receiver and the transmitter, the receiver produces a first sense signal based on which the control mechanism instructs the fan to stop its operation.

Preferably, the transmitter is an infrared (IR) transmitter and the receiver is an IR receiver; or the transmitter is an ultrasonic transmitter and the receiver is an ultrasonic receiver.

According to a preferred embodiment, when the signal received by the receiver is a direct signal sent from the transmitter, i) the transmitter is disposed on an internal bottom surface of the trash receptacle and the receiver on an internal side surface thereof so that a central transmission axis of the transmitter is oriented at an angle $\alpha$ of 30-50 degrees with respect to the internal bottom surface of the trash receptacle and that a central reception axis of the receiver is oriented at an angle $\beta$ of 38-58 degrees with respect to a vertical direction for the internal side surface of the trash receptacle; or ii) the receiver is disposed on the internal bottom surface of the trash receptacle and the transmitter on the internal side surface thereof so that the central reception axis of the receiver is oriented at an angle $\alpha$ of 30-50 degrees with respect to the internal bottom surface of the trash receptacle and that the central transmission axis of the transmitter is oriented at an angle $\beta$ of 38-58 degrees with respect to the vertical direction for the internal side surface of the trash receptacle.

According to an alternative embodiment, when the signal received by the receiver is a direct signal sent from the transmitter, the transmitter and the receiver are disposed in opposition to each other on internal side surfaces of the trash receptacle and are both close to the internal bottom surface of the trash receptacle.

According to another preferred embodiment, when the signal received by the receiver is a signal from the transmitter that has been reflected, i) the transmitter and the receiver are both disposed on the internal bottom surface of the trash receptacle, with the central transmission axis of the transmitter and the central reception axis of the receiver being both directed upward; or ii) the transmitter and the receiver are both disposed on an internal side surface of the trash receptacle, with the central transmission axis of the transmitter and the central reception axis of the receiver being both directed toward the interior of the receptacle.

Preferably, the transmitter and the receiver are fixed the internal surfaces of the trash receptacle by means of respective poka-yokes.

According to another preferred embodiment, the trash bag detection device further comprises dustproof, light-shading protective hoods that are attached to the internal surfaces of the trash receptacle and respectively house the transmitter and the receiver.

In a second aspect of the present invention, there is provided a smart trash receptacle comprising the trash bag detection device as defined above in any one of the above paragraphs.

In a third aspect of the present invention, there is provided a method for control of automatic bag replacement for a smart trash receptacle, the smart trash receptacle comprising the trash bag detection device as defined above, the method comprising the steps of:

activating the fan;

determining whether the receiver produces a first sense signal; and if so, deactivating the fan.

Preferably, the method further comprises, prior to the activation of the fan:

opening a main dump cover of the trash receptacle and determining whether a first sense signal is produced;

if so, raising an alert; and if not, closing the main dump cover and activating the fan.

The technical solution provided by the present invention offers the following beneficial effects:

1. Compared to conventional trash receptacles, it is capable of sensing the status of the trash bag within the receptacle, thus controlling the actions of the related mechanisms.

2. The "direct" detection approach (in which the receiver receives a direct signal) allows detecting whether a trash bag is present in the trash receptacle, while the "reflected" detection approach (in which the receiver receives a reflected signal) allows precisely determining the position of a trash bag in the trash receptacle based on the strength of the reflected signal so that the signal enables continuous position sensing, making it possible for the control system to make proper decisions in executing various program outputs.

3. The detection device is more resistant to inference from sunlight and will not fail under sunlight conditions.

4. The fan can be deactivated after the trash bag has been fitted in place in order to avoid it from being sucked into the fan and broken. This is helpful in protecting the trash bag, saving resources, reducing potential safety risks of the smart trash receptacle and increasing its stability and reliability.

Figure 1:
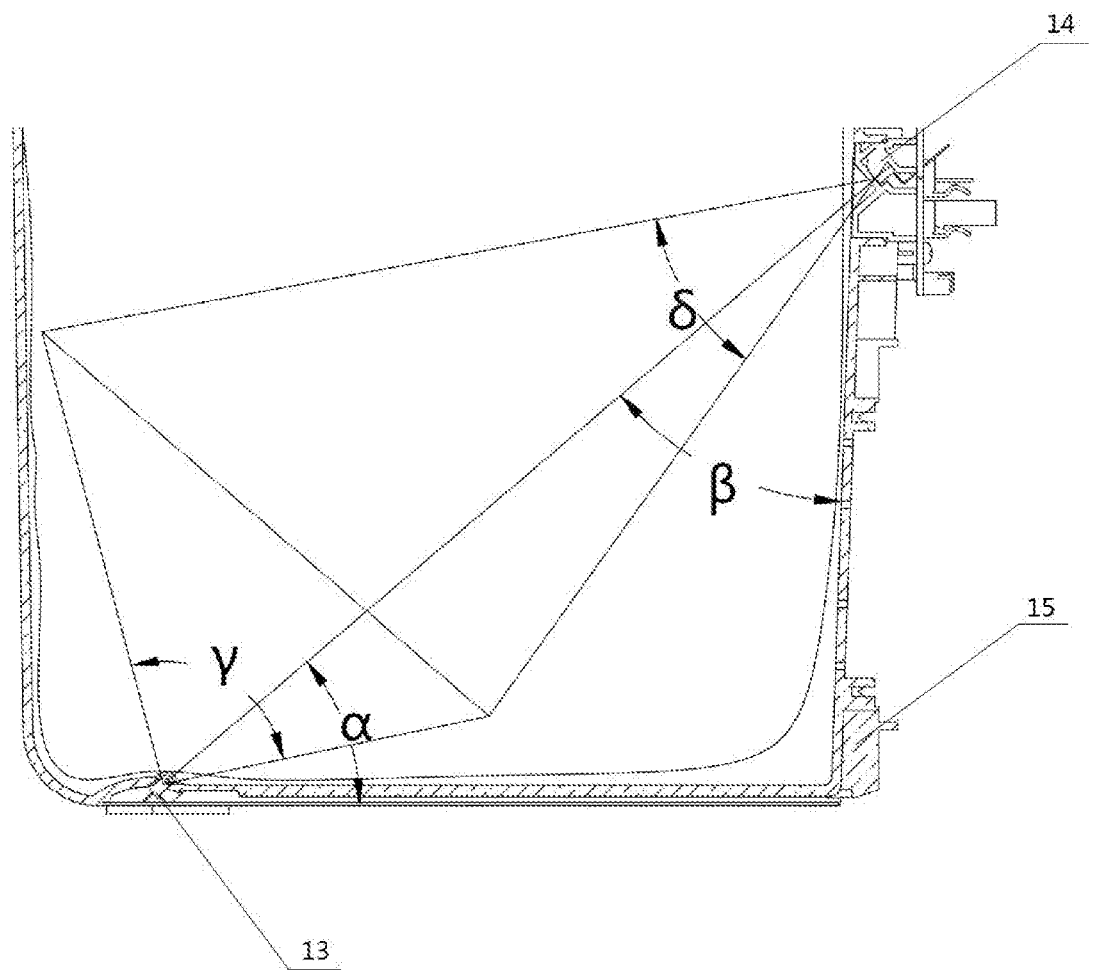
FIG. 1 is a structural schematic of a trash bag detection device according to a first embodiment of the present invention.

In these figures, 1 denotes a centrifugal impeller; 2, a motor; 3, an air inlet; 4, a blade; 5, a shoulder; 6, a wheel; 7, a top piece; 8, a bottom piece; 9, a post; 10, a recess; 11, a hole; 12, a screw; 13, an IR transmitter; 14, an IR receiver; 15, a fan; and 16, a protective hood.

DETAILED DESCRIPTION

Exemplary embodiments will be described in detail below, examples of which are illustrated in the accompanying drawings. Whenever mentioned in the following description, the same numbers in different figures represent the same or similar elements, unless otherwise stated. The implementations set forth in the following description of exemplary embodiments do not represent all implementations consistent with the claimed invention. Instead, they are merely some examples of devices and methods consistent with certain aspects of the invention as specified in the appended claims.

The subject matter of the present invention will be described in detail below so that the objects, features and advantages thereof will become more apparent. Obviously, the embodiments set forth below are only some, but not all possible embodiments of the inventions. All other embodiments made by those of ordinary skill in the art based on the embodiments disclosed herein without exerting any inventive effort are considered to fall within the scope of the invention.

Embodiment 1

In reference to FIGS. 1 to 6, a trash bag detection device for a smart trash receptacle according to a first embodiment of the present invention includes a transmitter 13 capable of transmitting a signal and a receiver 14 capable of receiving a signal. The transmitter 13 and the receiver 14 are disposed in opposition to each other on internal surfaces of the trash receptacle so that the receiver 14 can receive a direct signal transmitted from the transmitter 13. In this way, when a trash bag is partially present between the transmitter 13 and the receiver 14, the signal from the transmitter 13 will be blocked by the trash bag. In response, the receiver 14 will generate a first sense signal, thereby enabling detection of the position of the trash bag in the trash receptacle.

In this embodiment, the transmitter 13 and the receiver 14 may both be infrared (IR) devices, i.e., an IR transmitter and an IR receiver, respectively. However, the present invention is not so limited, because they may also be ultrasonic transmitting and receiving devices or other radar-like radio transmitting and receiving devices, without departing from the scope of the invention.

As infrared rays are electromagnetic waves whose wavelengths are between the microwave and visible light, it is highly stable and penetrative in nature. Moreover, the IR transmitter and the IR receiver are not expensive and helpful in saving cost. In addition, by this transmit-receive approach, the detection device is more resistant to inference from sunlight and can avoid failure of the transmitter and receiver when they are operating under sunlight conditions. For these reasons, the transmitter 13 and the receiver 14 are preferably implemented as an IR transmitter and an IR receiver, respectively, and the following description is given in the context of an IR transmitter and an IR receiver as an example.

In such an arrangement, the IR detection devices allow simple and reliable detection of the position of the trash bag in the trash receptacle, which is a piece of information necessary for further intelligence of the smart trash receptacle. Using such a position detection device with the smart trash receptacle is helpful in improving its automatic trash bag fitting quality and augmenting intelligence in its performance.

The trash bag detection device may further include a fan and a control mechanism. The fan is configured to evacuate the air from the trash receptacle through an air vent. As a result, the trash bag is pushed and automatically fitted into the trash receptacle by the ambient atmospheric pressure. Each of the fan, the IR transmitter 13 and the IR receiver 14 may be communicably coupled to the control mechanism, and the first sense signal may be transmitted to the control mechanism, based on which, operational statuses of the fan and other components involved in automatic bag replacement can be controlled.

In the way, during trash bag replacement for the smart trash receptacle, the trash bag detection device is not only capable of detecting the position of the trash bag in the trash receptacle, but can deactivate the fan 15 after the trash bag has been fitted in place in order to avoid it from being sucked into the fan 15 and broken. Thus, the trash bag detection device is helpful in protecting the trash bag, saving resources, reducing potential safety risks of the smart trash receptacle and increasing its stability and reliability.

In some embodiments, one of the IR transmitter 13 and IR receiver 14 may be provided on an internal side surface of the trash receptacle and the other on an internal bottom surface thereof. That is, it is either possible that the IR transmitter 13 is disposed on the internal side surface of the trash receptacle and the IR receiver 14 on the internal bottom surface thereof, or that the IR transmitter 13 is disposed on the internal bottom surface and the IR receiver 14 on the internal side surface, and this may be determined based on the actual circumstances. Additionally, the fan may be provided at the junction of the internal side surface and internal bottom surface of the trash receptacle. In this way, the air being evacuated from the air vent will always traverse between the IR transmitter 13 and the IR receiver 14. In the trash bag fitting process proceeding under the action of air evacuation by the fan 15, any part of the trash bag will not be situated between the IR transmitter 13 and the IR receiver 14 prior to the completion of the fitting process, and accordingly, the IR receiver 14 will not produce the first sense signal. Subsequent to the completion of the trash bag fitting process, the trash bag will be present between the IR transmitter 13 and the IR receiver 14, triggering generation of the first sense signal by the IR receiver 14 and further deactivation of the fan 15 by the control mechanism based on the received first sense signal.

In the case of the IR transmitter 13 on the internal bottom surface of the trash receptacle and of the IR receiver 14 on the internal side surface thereof, a central transmission axis of the IR transmitter 13 may be oriented at an angle $\alpha$ of 30-50 degrees with respect to the internal bottom surface of the trash receptacle, with a central reception axis of the IR receiver 14 being oriented at an angle $\beta$ of 38-58 degrees with respect to a vertical direction for the internal side surface of the trash receptacle. As shown in FIG. 1, the vertical direction for the internal side surface is the direction perpendicular to the bottom surface of the trash receptacle. As any reduction in the angle $\alpha$ will increase the possibility of sensing errors that may cause negative effects on the positional detection for the trash bag, and since any increase in the angle $\alpha$ will require the IR receiver 14 to be disposed more distant, which is unfavorable to both the detection and the assembly. This arrangement allows cost savings, easy assembly and higher detection accuracy.

In the case of the IR receiver 14 on the internal bottom surface of the trash receptacle and of the IR transmitter 13 on the internal side surface thereof, the central reception axis of the IR receiver 14 may be oriented at an angle $\alpha$ of 30-50 degrees with respect to the internal bottom surface of the trash receptacle, with the central transmission axis of the IR transmitter 13 being oriented at an angle $\beta$ of 38-58 degrees with respect to the vertical direction for the internal side surface of the trash receptacle. As any reduction in the angle $\alpha$ will increase the possibility of sensing errors that may cause negative effort on the positional detection for the trash bag, and since any increase in the angle $\alpha$ will require the IR transmitter 13 to be disposed more distant, which is unfavorable to both the detection and the assembly, this arrangement allows cost savings, easy assembly and higher detection accuracy.

In a preferred example of this embodiment, the angle $\alpha$ is 40 degrees and the angle $\beta$ is 48 degrees. In this way, the distance between the detectors is moderate and good detection results can be obtained, resulting in cost savings and easy assembly.

In addition, the IR transmitter 13 may be configured to transmit infrared rays at a maximum angle $\gamma$ of 93 degrees, and the IR receiver 14 may be configured to receive infrared rays at a maximum angle $\delta$ of 44 degrees, as shown in FIG. 1. In this way, both the transmission and reception can be performed in a wide angle range, which is conducive to the accuracy of positional detection for the trash bag.

In another embodiment, IR receiver 14 and the IR transmitter 13 may be disposed on respective internal side surfaces of the trash receptacle in such a manner that they are close to the internal bottom surface thereof on which the fan is provided. With this arrangement, the air being evacuated from the air vent will always traverse between the IR transmitter 13 and the IR receiver 14. In the trash bag fitting process proceeding under the action of air evacuation by the fan 15, any part of the trash bag will not be situated between the IR transmitter 13 and the IR receiver 14 prior to the completion of the fitting process, and accordingly, the IR receiver 14 will not produce the first sense signal. Subsequent to the completion of the trash bag fitting process, the trash bag will be present between the IR transmitter 13 and the IR receiver 14, triggering generation of the first sense signal by the IR receiver 14 and deactivation of the fan 15 by the control mechanism based on the received first sense signal.

Figure 2:
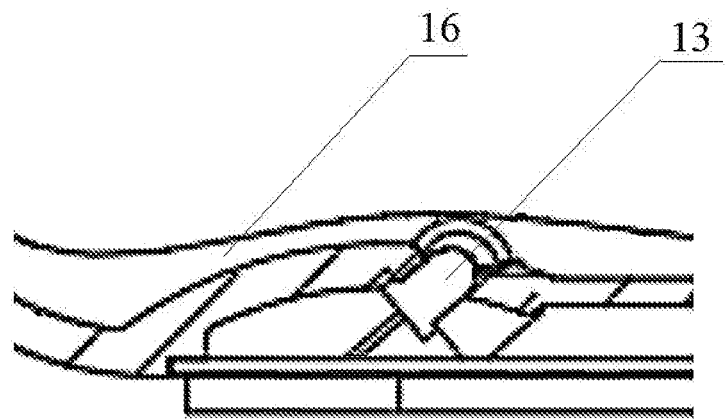
FIG. 2 is an enlarged view of a portion of FIG. 1, showing an IR transmitter.
Figure 3:
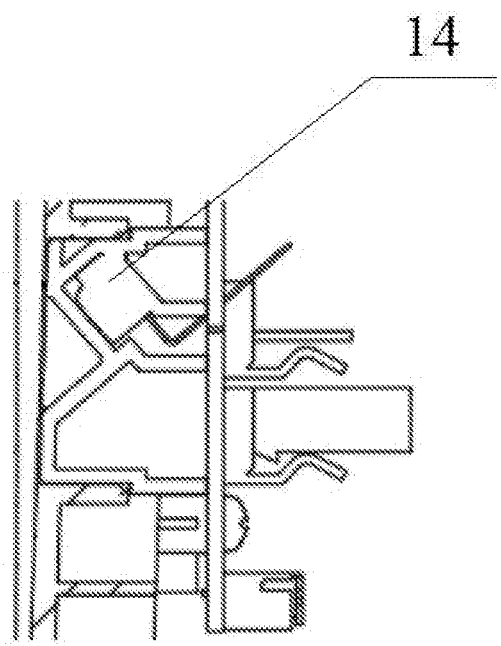
FIG. 3 is an enlarged view of a portion of FIG. 1, showing an IR receiver.

As shown in FIGS. 2 to 3, the IR transmitter 13 and receiver 14 may be structurally fixed in terms of both position and angle so as to ensure that the IR transmitter 13 transmits the signal directly toward the IR receiver 14. Moreover, the IR transmitter 13 and IR receiver 14 may be structured to limit the angle of transmission so as to avoid the IR signal from propagating through the gap between the trash bag and the bottom of the receptacle to reach the IR receiver 14. In other words, the IR transmitter 13 and receiver 14 may be both fixed at desired orientation angles on the internal surfaces of the trash receptacle by poka-yokes known in the art which ensure their positional and angular correctness. The use of such poka-yokes can result in savings in time and labor as well as an improvement in efficiency.

Further, each of the poka-yokes may be comprised of a concave member and a convex member that can be snugly received in the concave member. Additionally, on the internal surfaces of the trash receptacle, cavities that can snugly receive the IR transmitter 13 and the IR receiver 14 and are oriented to limit their aforesaid angles may be formed. One of the concave and convex members may be disposed over an outer surface of the IR receiver 14 or the IR transmitter 13 and the other over an inner surface of a respective one of the cavities. The concave member may extend axially. For example, in the case of the convex member disposed over the outer surface of the IR receiver 14 or the IR transmitter 13 and of the concave member over the inner surface of the respective cavity, the term "axially" is meant to refer to a direction in which the cavity extends. In this way, with the poka-yokes each constructed from such concave and convex members, the IR transmitter 13 and the IR receiver 14 can be both fixed at desired orientation angles with guaranteed positional and angular correctness. As a result, savings in time and labor and improved efficiency can be achieved.

Figure 4:
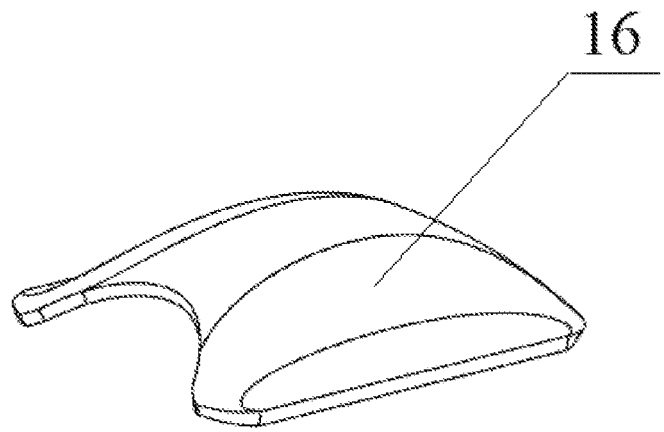
FIG. 4 is a structural schematic of a protective hood in the trash bag detection device according to the first embodiment.

In some embodiments, the IR transmitter 13 and the IR receiver 14 may both be made waterproof and dustproof by means of transparent protective hoods 16 hermetically attached to the internal surfaces of the trash receptacle. Although the IR transmitter 13 and the IR receiver 14 are housed in the protective hoods 16, positional detection for the trash bag is still possible since the transparent nature of these protective hoods 16 allows the transmission of infrared rays therethrough. Of course, two protective hoods 16 may be provided respectively for the IR transmitter 13 and the IR receiver 14, in order for material savings and lower cost to be achieved. The protective hoods 16 may be structured as shown in FIG. 4 and made of either plastic or glass, depending on the actual circumstances.

Figure 5:
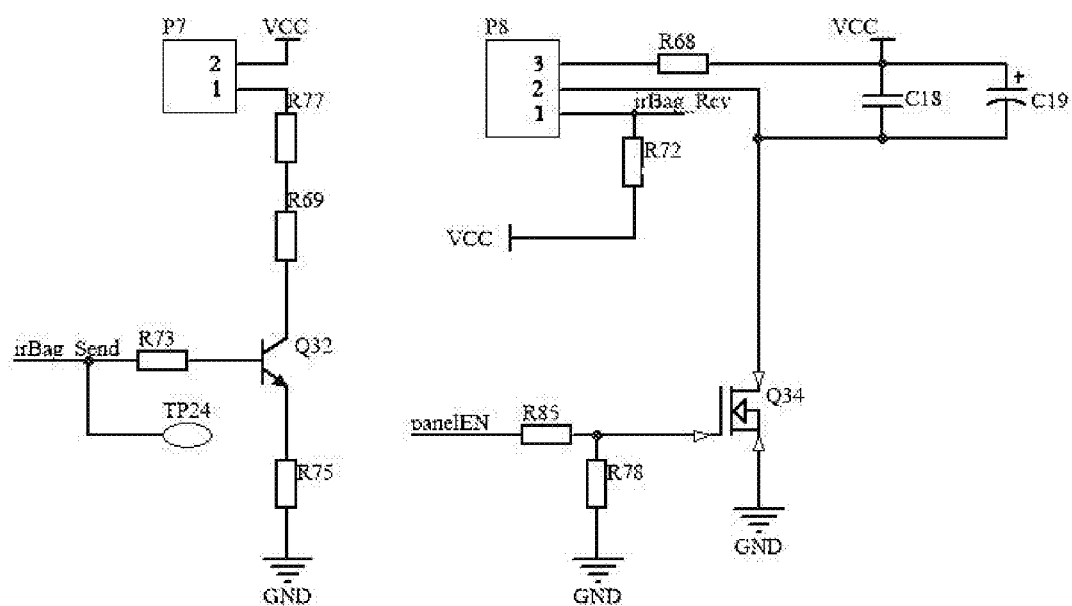
FIG. 5 is a circuit diagram of the IR receiving circuitry in the trash bag detection device according to the first embodiment.

The control mechanism may include a microcontroller unit (MCU) as well as IR Tx/Rx circuitry composed of an amplification circuit, a modulator/demodulator (modem) circuit and the like. As shown in FIG. 5, the MCU may be configured to produce a modulated carrier signal at 38 KHz and provide it to the IR transmitter 13. If the carrier signal from the IR transmitter 13 is not obstructed by an obstacle (trash bag), it can be successfully received by the IR receiver 14. When obstructed midway by an obstacle (trash bag), the carrier signal from the IR transmitter 13 will no longer smoothly reach the IR receiver 14. As a result, the modulated carrier signal arriving at the IR receiver 14 will be very weak or even will not be received at all. In this way, positional detection for the trash bag is made possible.

The carrier signal received at the IR receiver 14 may further undergo gain amplification and demodulation before it is processed and then sent to a comparator. The comparator then generates a first sense signal as an output. This imparts very strong interference resistance to the detection, making it normally performable under harsh lighting conditions and under sunlight. The IR transmitter 13 may be configured to transmit the signal at a power level that is so limited to disallow the signal to transmit through the trash bag to arrive at the IR receiver 14. Upon unsuccessfully receipt of the IR signal at the IR receiver 14, the presence of the trash bag can be confirmed and the fan 15 can be instructed to cease its operation.

In one particular embodiment, there is also provided a smart trash receptacle including the trash bag detection device as defined above. In doing so, during trash bag replacement for the smart trash receptacle, the trash bag detection device is not only capable of detecting the position of the trash bag in the trash receptacle, but can deactivate the fan 15 after the trash bag has been fitted in place in order to avoid it from being sucked into the fan 15 and broken. Thus, the trash bag detection device is helpful in protecting the trash bag, saving resources, reducing potential safety risks of the smart trash receptacle and increasing its stability and reliability. Since the smart trash receptacle offers the substantially same beneficial effects as the above-described trash bag detection device, it will not be described in further detail herein for the sake of simplicity.

Figure 7:
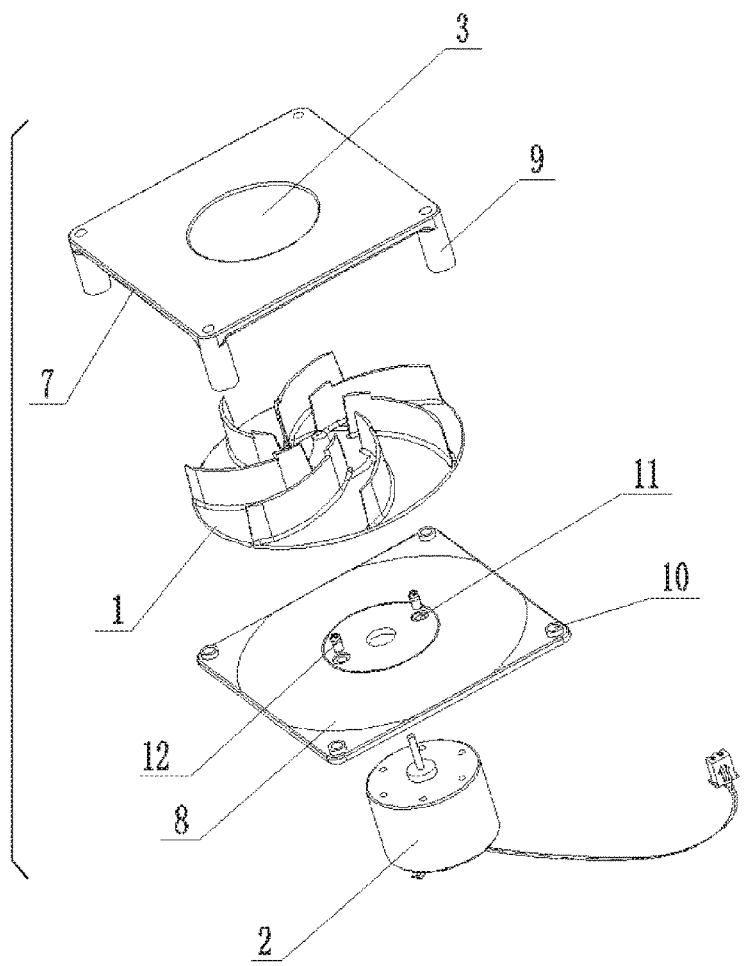
FIG. 7 is an exploded view of a fan in the smart trash receptacle according to the first embodiment.
Figure 8:
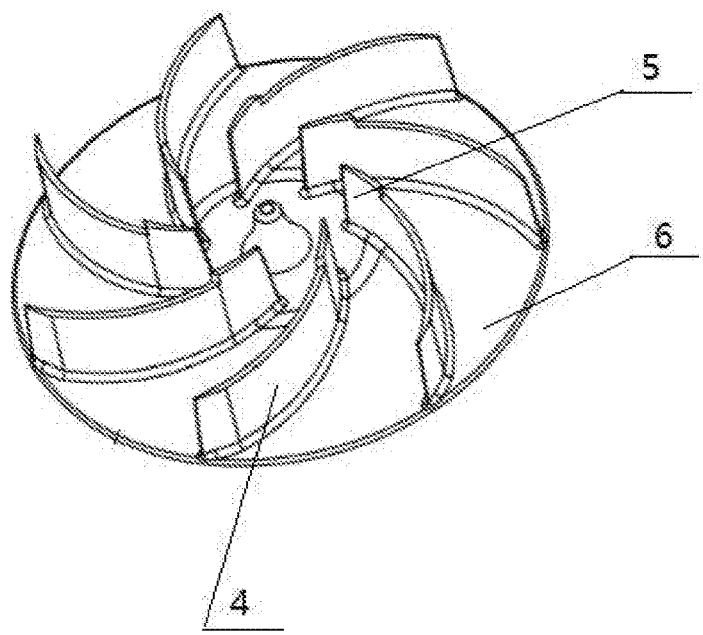
FIG. 8 is a structural schematic of a centrifugal impeller in the fan in the smart trash receptacle according to the first embodiment.

Referring to FIGS. 7 to 8, in some embodiments, the smart trash receptacle may include the fan 15 which has a casing and a centrifugal impeller 1 housed in the casing. The fan 15 may further include a motor 2 for driving the centrifugal impeller 1 to rotate, and the casing may define an air inlet 3 opposing the centrifugal impeller 1 axially and an air outlet radially opposing the centrifugal impeller 1. Moreover, the air inlet 3 may communicate with the air vent that is formed in an inner wall of a main body of the trash receptacle and the air outlet with the outside of the main body. When the centrifugal impeller 1 is driven to rotate by the motor 2, air will be evacuated from the main body through the air vent at the bottom thereof so that the ambient atmospheric pressure will be much higher than the air pressure in the main body and hence push the trash bag downward. Upon the lower end of the trash bag coming into contact with the bottom of the trash receptacle, the fitting action is completed and the motor may then be turned off.

In particular, the centrifugal impeller 1 may have blades 4 each provided with, at a portion thereof in positional correspondence with the air inlet 3, a shoulder 5 projecting toward the air inlet 3. This design allows an increased wind shear area, air intake and suction power, faster air evacuation, reduced time required for vacuum creation, time savings in trash bag fitting and improved operational efficiency.

It should be noted that the shoulders 5 may be sheet-like and have the same thicknesses as the respective blades 4. For the sake of simplicity in their fabrication process, the shoulders 5 may be integral with the respective blades 4. In this way, a greater wind shear area and easy fabrication can be both achieved.

With this arrangement, the problem of insufficient suction power of fans adopted in the conventional smart trash receptacles can be overcome.

In a preferred implementation, the centrifugal impeller 1 may further include a wheel 6 to which the individual blades 4 are all fixed. As shown in FIG. 8, the blades 4 may be all oriented perpendicular to the wheel 6. In this implementation, each of the blades 4 may be curved in shape and have an end portion away from a center of the wheel 6 that is thinner than its remaining portion. This design allows effective airflow control and prompt ventilation.

It should be noted that, in one embodiment, the casing may be comprised of a top piece 7 and a bottom piece 8 detachably coupled to the top piece 7. The air inlet 3 may be defined in the top piece 7, with gaps between the top piece 7 and the bottom piece 8 providing the air outlet.

In a preferred implementation, both the top piece 7 and the bottom piece 8 may be rectangular. In addition, the top piece 7 may be engaged with the bottom piece 8 by snugly inserting at least two posts 9 projecting from a bottom side of the top piece 7 into respective at least two recesses 10 in the bottom piece 8. Specifically, in order to ensure secure engagement, four posts 9 may be provided at the respective corners of the top piece 7.

In this way, the casing appears as a four-sided open structure. Additionally, the air inlet 3 may have a circular cross-section. The centrifugal impeller 1 may operate in a centrifugal manner in which air is sucked in through the circular air inlet 3 and fast discharged from the four open sides of the casing. Of course, the air inlet 3 may also assume a different shape.

Further, the centrifugal impeller 1 may be provided with a shaft hole in which a main shaft of the motor 2 is received and secured. Additionally, the bottom piece 8 may be provided with a hole 11 through which the main shaft is inserted. The bottom piece 8 may be first fastened to the motor 2 with screws 12, and the centrifugal impeller 1 may be then secured to the output shaft of the motor 2. Finally, the top piece 7 may be engaged with the bottom piece 8, thus forming the fan.

The so formed fan 15 can evacuate the air from the main body of the trash receptacle through the air vent thereof, reducing the pressure therein below the ambient atmospheric pressure. As a result, the weakness-free trash bag is pushed down to the bottom of the receptacle. At this point, the fan may be turned off, with the trash bag having been fitted over the internal surfaces of the main body. Therefore, the fitting of the trash bag does not require human intervention, allowing convenience and ease of use.

In a particular embodiment, there is also provided a method for control of automatic bag replacement for the smart trash receptacle as defined above. The method includes:

activating the fan 15;

determining whether the IR receiver produces a first sense signal;

if so, deactivating the fan 15.

Figure 6:
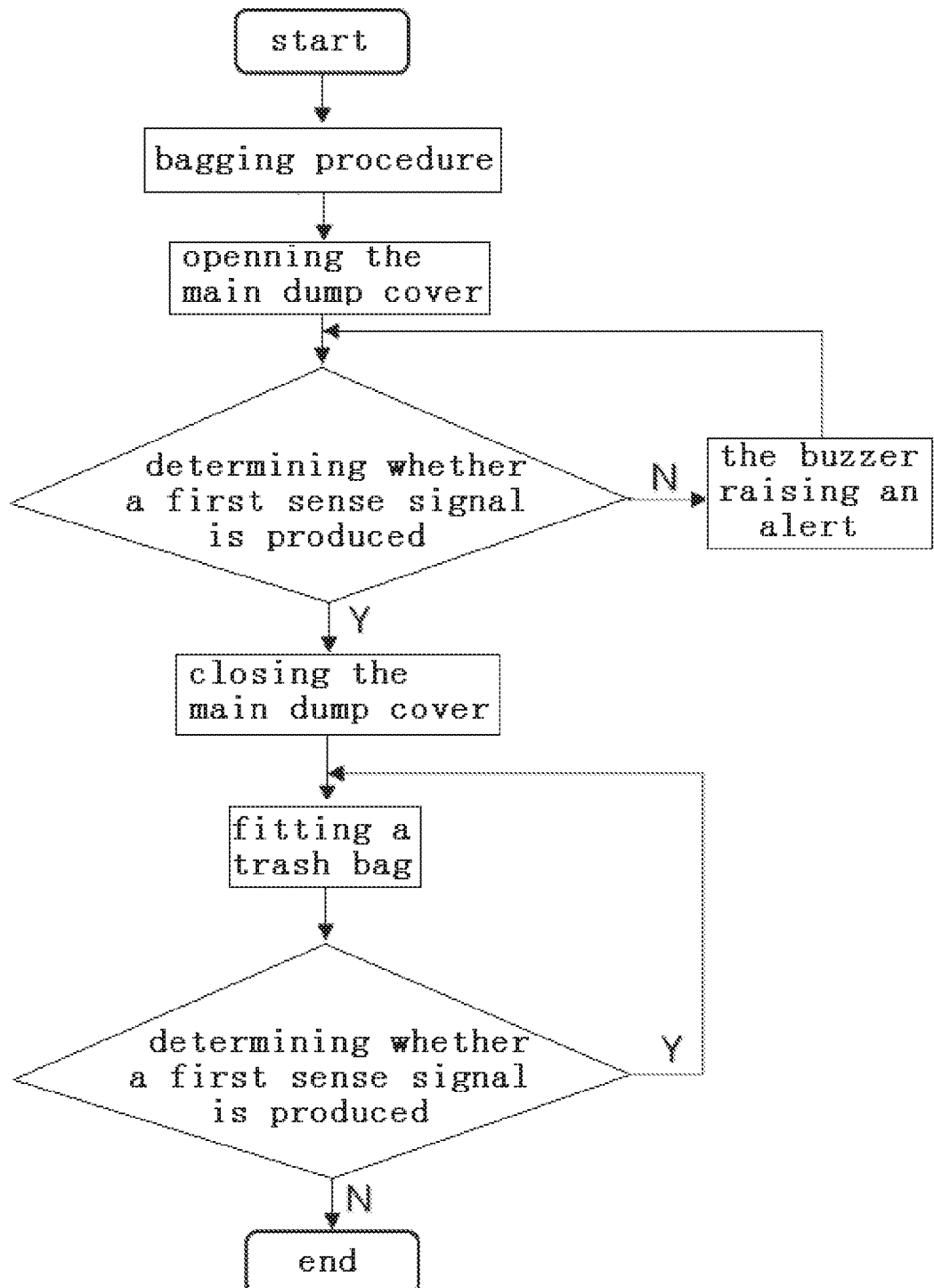
FIG. 6 is a flowchart of a method for control of automatic bag replacement for a smart trash receptacle according to the first embodiment.

Further, prior to the activation of the fan 15, detection may be performed to find whether there is bagged trash within the trash receptacle. This can avoid the degradation in positional detection accuracy during subsequent trash bag fitting due to the bagged trash remaining in the receptacle. FIG. 6 is a flowchart illustrating a detailed process of the method, including:

opening a main dump cover of the trash receptacle and then determining whether a first sense signal is produced;

if so, raising an alert;

if not, closing the main dump cover and activating the fan 15;

determining whether the IR receiver produces a first sense signal;

if so, deactivating the fan 15.

It should be noted that the "main dump cover" may form an internal bin for containing bagged trash. The opening and closing of the main dump cover may be part of a bagging procedure. In other words, when a segment of the trash bag containing trash is closed and fusion cut, it will drop into the internal bin which may then tip, i.e., opening of the main dump cover, to allow the bagged trash to be taken away. After the system senses that the trash have been taken out, the main dump cover may be closed, i.e., restoration of the internal bin, so that a trash bag fitting procedure may then proceed. The "alert" may be given by a buzzer to prompt the operator to take the bagged trash away so as to avoid it from remaining within the internal bin.

Embodiment 2

Figure 9:
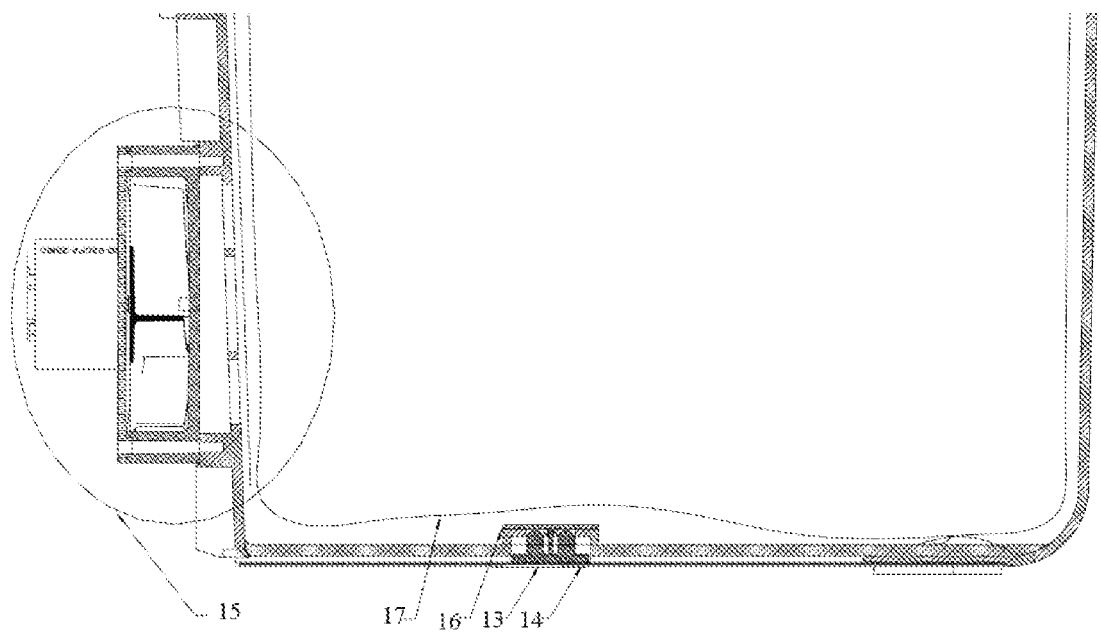
FIG. 9 is a structural schematic of a trash bag detection device according to a second embodiment of the present invention.
Figure 10:
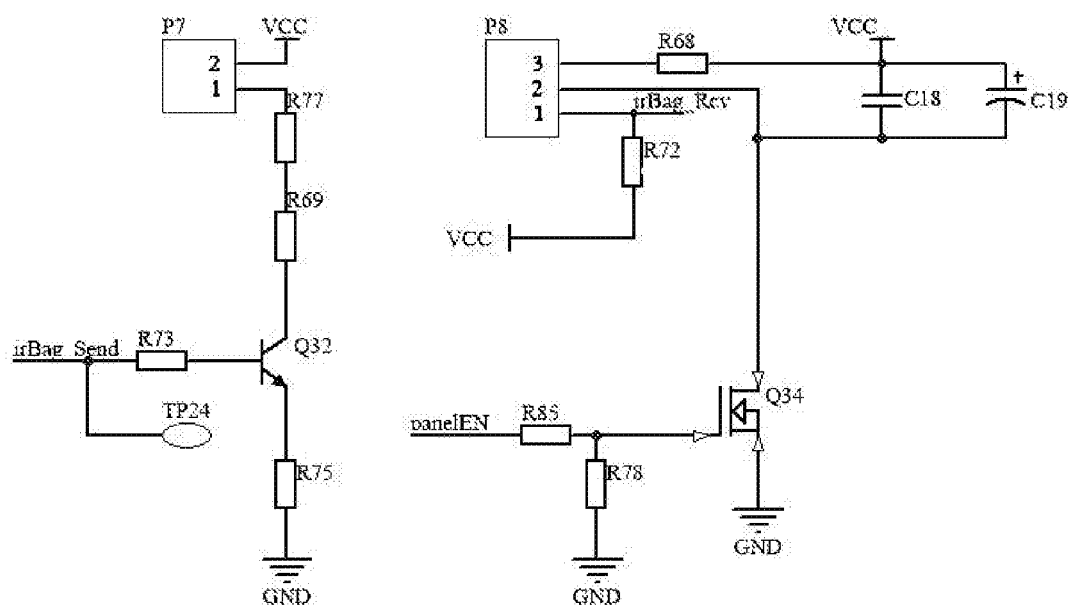
FIG. 10 is a circuit diagram of an IR receiving circuitry in the trash bag detection device according to the second embodiment.
Figure 11:
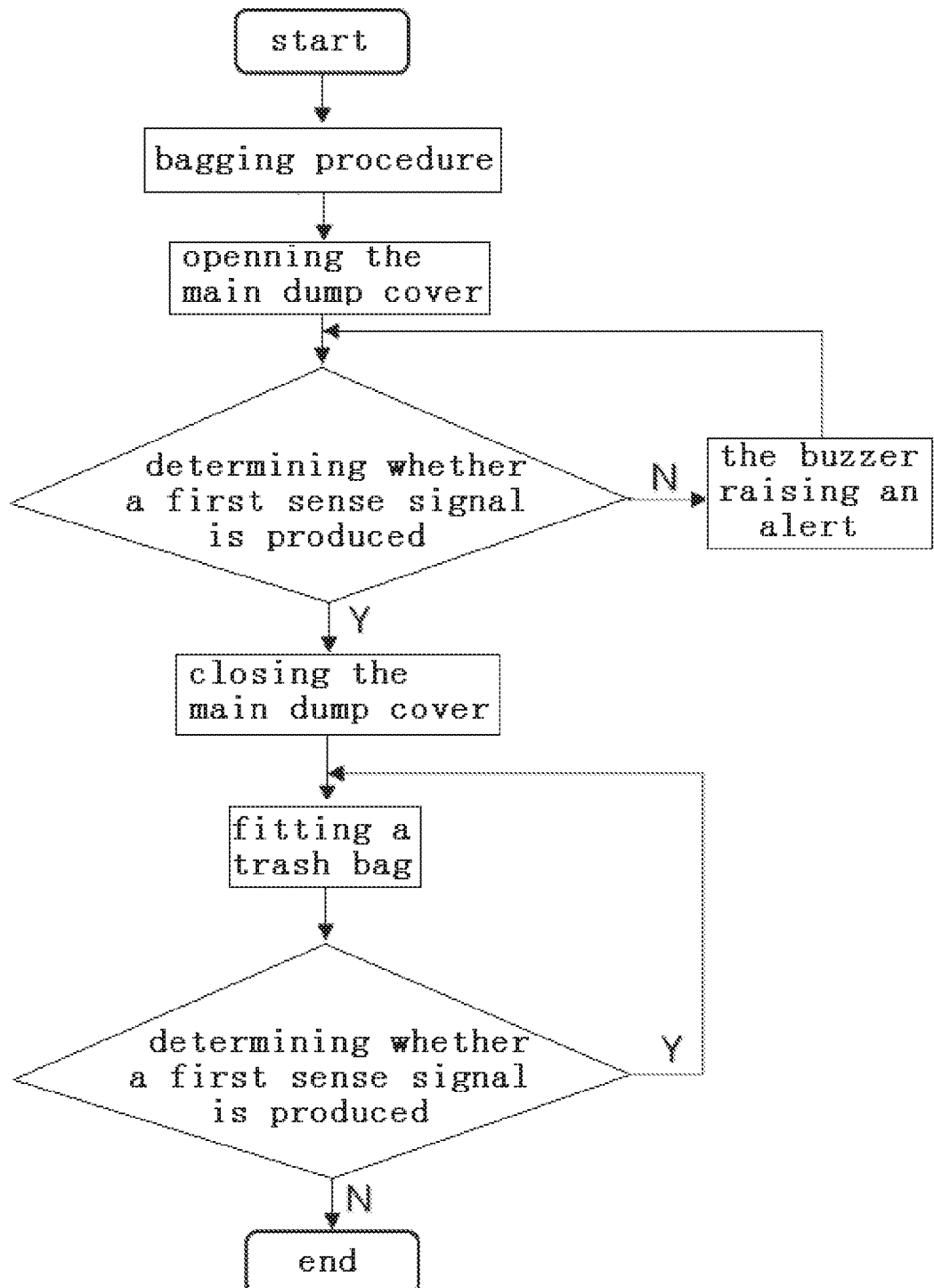
FIG. 11 is a flowchart of a method for control of automatic bag replacement for a smart trash receptacle according to the second embodiment.

Reference is now made to FIGS. 9 to 11, in which a trash bag detection device for a smart trash receptacle according to a second embodiment of the present invention is shown. For the sake of easy understanding, the same components in this embodiment are indicated by the same reference numbers as Embodiment 1.

As shown in figures, the trash bag detection device according to this embodiment includes a transmitter 13 and a receiver 14. The transmitter 13 is able to transmit a signal which can be reflected at a trash bag 17 or another object so that the reflected part of it is received as a reflected signal by the receiver 14. Moreover, both of the receiver 14 and the transmitter 13 are disposed on an internal surface of the trash receptacle. When the trash bag 17 is approaching downward while being fitted, the reflected signal will become increasingly stronger as the distance from the detectors to the trash bag 17 is being shortened. As a result of the increasingly stronger reflected signal received by the receiver 14, the position of the trash bag 17 in the trash receptacle can be precisely perceived.

The aforementioned internal surface may either be an internal side surface of the trash receptacle or an internal bottom surface thereof. The transmitter 13 and the receiver 14 are not limited to any particular positional layout as long as they are not directed toward each other to allow the signal from the transmitter 13 to be reflected at the approaching trash bag 17 or another approaching object so that part of it is received by the receiver 14 as a reflected signal.

The trash bag detection device may further include a fan and a control mechanism. The fan is configured to evacuate the air from the trash receptacle so that the trash bag 17 is pushed and automatically fitted into the trash receptacle by the ambient atmospheric pressure. Each of the transmitter 13, the receiver 14 and the fan may be communicably coupled to the control mechanism, and the reflected signal received by the receiver 14 may be fed to the control mechanism. Based on the strength of the reflected signal received by the receiver 14, the control mechanism may control operational statuses of the fan and other components involved in automatic bag replacement. Further, the control mechanism may determine the position of the trash bag 17 in the trash receptacle based on how strong the reflected signal is. In this way, the signal enables continuous position sensing, making it possible for the control system to make proper decisions in executing various program outputs.

In the way, during trash bag replacement for the smart trash receptacle, the trash bag detection device is not only capable of detecting the position of the trash bag 17 in the trash receptacle, but can perform control based on the detected information about the position of the trash bag 17, so that the fitting process is kept running and ceased respectively before and after the trash bag 17 has been fitted in place while avoiding the trash bag 17 from being sucked into the fan 15 and broken. Thus, the trash bag detection device is helpful in protecting the trash bag, saving resources, reducing potential safety risks of the smart trash receptacle and increasing its stability and reliability.

With similarity to Embodiment 1, in this embodiment, the transmitter 13 is preferably implemented as an infrared (IR) transmitter and the receiver 14 accordingly as an IR receiver. In other words, an IR signal is transmitted, reflected and partially received.

In such an arrangement, the process carried out by the IR devices, involving transmission, reflection and reception, allows simple and reliable detection of the position of the trash bag 17 in the trash receptacle and effective prevention of partial breakage of the trash bag 17 during the automatic bag replacement process. In addition, the position of the trash bag 17 is a piece of information necessary for further intelligence of the smart trash receptacle. Using such a position detection device with the smart trash receptacle is helpful in improving the receptacle's quality in automatic fitting of the trash bag 17 and augmenting intelligence in its performance.

In some embodiments, the transmitter 13 and the receiver 14 are both disposed on the internal bottom surface of the trash receptacle. In this case, the trash bag 17 will gradually approach, from the top downward, the internal bottom surface of the trash receptacle while it is being fitted. As a result, with the trash bag 17 getting increasingly closer, a greater and greater part of the signal will be reflected and the reflected signal received by the receiver 14 will become stronger and stronger, allowing precise perception of the position of the trash bag 17. Further, both a central transmission axis of the transmitter 13 and a central reception axis of the receiver 14 may be directed upward. Here, the terms "upward" and "downward" are referred to with respect to the configuration of the device as shown in FIG. 1. With this design, a signal path for transmission, reflection and reception can be shortened. Moreover, transmission along the central transmission axis imparts high strength to the transmitted signal, and reception along the central reception axis allows good signal reception performance. In this way, both a shorter sensing distance and higher signal strength can be achieved, which is conducive to the device's accuracy and promptness.

Figure 12:
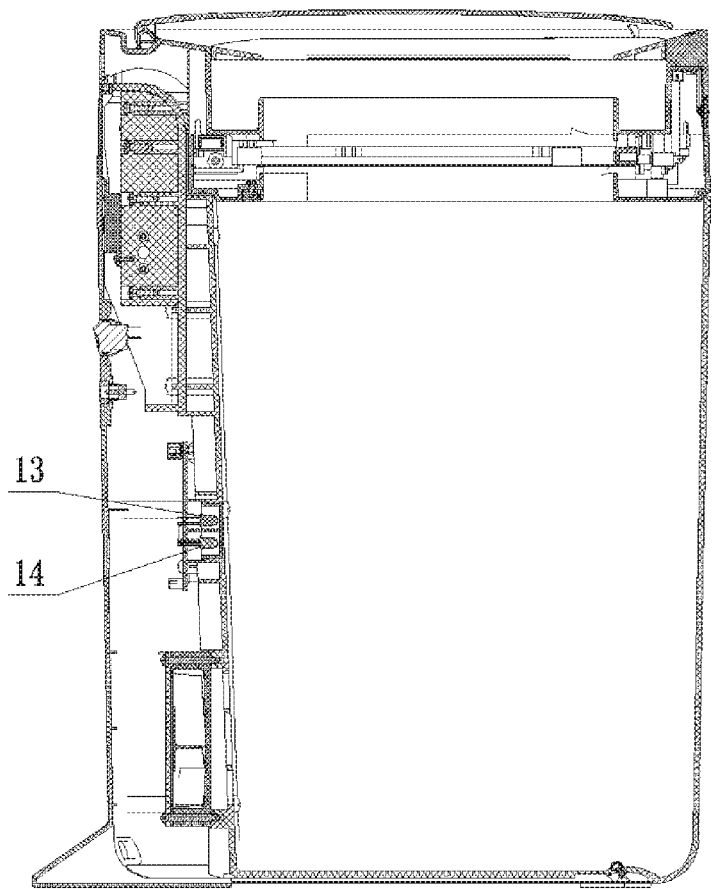
FIG. 12 is a structural schematic of a transmitter and a receiver in the trash bag detection device, which are both disposed on an internal surface of the trash receptacle according to the second embodiment.

In some embodiments, shown in FIG. 12, the transmitter 13 and the receiver 14 are both disposed on the internal side surface of the trash receptacle, with their central transmission and reception axis pointing toward the interior of the receptacle.

Similarly, the IR transmitter and receiver may also be structurally fixed in terms of both position and angle so as to ensure that the IR transmitter transmits the signal directly toward the IR receiver. Moreover, the IR transmitter 13 and IR receiver 14 may be structured to so limit the angle of transmission as to avoid the IR signal from propagating through the gap between the trash bag and the bottom of the receptacle to reach the IR receiver 14. Specifically, the IR transmitter 13 and receiver 14 may be both fixed at desired orientation angles on the internal surface of the trash receptacle by poka-yokes known in the art which ensure their positional and angular correctness. The use of such poka-yokes allows one-time fixation in flexible relative positional and angular relationships, resulting in savings in time and labor as well as an improvement in efficiency.

In some embodiments, the IR transmitter 13 and the IR receiver 14 may both be made waterproof and dustproof by means of transparent protective hoods 16 hermetically attached to the internal surface of the trash receptacle. Although the IR transmitter 13 and the IR receiver 14 are housed in the protective hoods 16, positional detection for the trash bag 17 is still possible since the transparent nature of these protective hoods 16 allows the transmission of the signal therethrough. Of course, two protective hoods 16 may be provided respectively for the IR transmitter 13 and the IR receiver 14, in order for material savings and lower cost to be achieved. The protective hoods 16 may be structured as shown in FIG. 4, and made of either plastic or glass, depending on the actual circumstances.

The control mechanism may include a microcontroller unit (MCU) as well as IR Tx/Rx circuitry composed of an amplification circuit, a modulator/demodulator (modem) circuit and the like. As shown in FIG. 10, the MCU may be configured to produce a modulated carrier signal at 38 KHz and provide it to the transmitter. If the carrier signal from the IR transmitter 13 is not reflected by an obstacle (trash bag 17), it will not reach the receiver. Otherwise, when the carrier signal from the IR transmitter 13 is reflected by an obstacle (trash bag 17), it will be partially received by the receiver, and the position of the trash bag 17 can be known by analyzing the strength of the received signal.

The carrier signal received at the receiver 14 may further undergo gain amplification and demodulation before it is processed and then sent to a comparator. The comparator then generates a first sense signal as an output. This imparts very strong interference resistance to the detection, making it normally performable under harsh lighting conditions and under sunlight. The transmitter 13 may be configured to transmit the signal at a power level that is so limited to allow the receiver to successfully receive the reflected signal. Based on the received reflected signal, the position of the receptacle trash bag 17 can be determined and serve as a basis for controlling the operational status of the fan 15.

In this particular embodiment, there is also provided a smart trash receptacle including the trash bag detection device as defined above. In doing so, during replacement of the trash bag 17 for the smart trash receptacle, the trash bag detection device is not only capable of detecting the position of the trash bag 17 in the trash receptacle, but can deactivate the fan 15 after the trash bag 17 has been fitted in place in order to avoid it from being sucked into the fan 15 and broken. Thus, the trash bag detection device is helpful in protecting the trash bag 17, saving resources, reducing potential safety risks of the smart trash receptacle and increasing its stability and reliability. Since the smart trash receptacle offers the substantially same beneficial effects as the above-described trash bag detection device, it will not be described in further detail herein for the sake of simplicity.

The foregoing description merely presents a few particular embodiments of the present invention and does not limit the scope thereof in any sense. Any and all variations or substitutions easily devisable by those familiar with the art in light of the teachings disclosed herein are considered to fall within the scope of the present invention. Accordingly, the scope of the invention shall be as defined in the appended claims.

What is claimed is:

1. A trash bag detection device for a smart trash receptacle, comprising:
   a transmitter (13) for transmitting a signal and a receiver (14) for receiving a signal, both the transmitter (13) and the receiver (14) being disposed on internal surfaces of the trash receptacle;

a fan (15) for evacuating the trash receptacle, the fan including
a casing,
a centrifugal impeller (1) housed in the casing, and
a motor (2) for driving the centrifugal impeller (1) to rotate,
the casing defining an air inlet (3) opposing the centrifugal impeller (1) axially and an air outlet opposing the centrifugal impeller (1) radially; and
a control mechanism, to which each of the transmitter (13), the receiver (14) and the fan (15) is communicatively coupled, the control mechanism being configured to control an operational status of the fan (15) based on the signal received by the receiver, wherein
the signal received by the receiver (14) is a direct signal sent from the transmitter (13), such that in the event of a trash bag is present between the receiver (14) and the transmitter (13), the receiver (14) produces a first sense signal based on which the control mechanism instructs the fan (15) to stop its operation, and
the transmitter (13) and the receiver (14) are disposed respectively on an internal bottom surface and an internal side surface of the trash receptacle, or alternatively respectively on the internal side surface and the internal bottom surface of the trash receptacle, wherein
when the transmitter is disposed on the internal bottom surface of the trash receptacle, a central transmission axis of the transmitter (13) is oriented at an angle α of 30-50 degrees with respect to the internal bottom surface of the trash receptacle, and a central reception axis of the receiver (14) is oriented at an angle β of 38-58 degrees with respect to a vertical direction along the internal side surface of the trash receptacle, and
when the receiver (14) is disposed on the internal bottom surface of the trash receptacle, the central reception axis of the receiver (14) is oriented at the angle α of 30-50 degrees with respect to the internal bottom surface of the trash receptacle, and the central transmission axis of the transmitter (13) is oriented at the angle β of 38-58 degrees with respect to the vertical direction along the internal side surface of the trash receptacle.

2. The trash bag detection device according to claim 1, wherein
the transmitter (13) is an infrared (IR) transmitter and the receiver (14) is an IR receiver;
or the transmitter (13) is an ultrasonic transmitter and the receiver (14) is an ultrasonic receiver.

3. The trash bag detection device according to claim 1, wherein the transmitter (13) and the receiver (14) are fixed to the internal surfaces of the trash receptacle by means of respective poka-yokes.

4. The trash bag detection device according to claim 1, further comprising dustproof and light-shading protective hoods (16) that are attached to the internal surfaces of the trash receptacle, and the transmitter (13) and the receiver (14) are housed in the protective hoods (16) respectively.

5. A smart trash receptacle, comprising the trash bag detection device according to claim 1.

* * * * *